US012753261B2

(12) United States Patent
White et al.

(10) Patent No.: US 12,753,261 B2
(45) Date of Patent: Oct. 6, 2026

(54) AMINE-TERMINATED OXAMIDE CURATIVES

(71) Applicant: 3M INNOVATIVE PROPERTIES COMPANY, St. Paul, MN (US)

(72) Inventors: Kolby L. White, Woodbury, MN (US); Gregory P. Sorenson, Maplewood, MN (US); Matthew J. Kryger, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 573 days.

(21) Appl. No.: 18/264,594

(22) PCT Filed: Feb. 7, 2022

(86) PCT No.: PCT/IB2022/051066

§ 371 (c)(1),
(2) Date: Aug. 8, 2023

(87) PCT Pub. No.: WO2022/195365

PCT Pub. Date: Sep. 22, 2022

(65) Prior Publication Data

US 2024/0124639 A1 Apr. 18, 2024

Related U.S. Application Data

(60) Provisional application No. 63/200,610, filed on Mar. 18, 2021.

(51) Int. Cl.
*C08F 283/10* (2006.01)
*C09J 151/08* (2006.01)

(52) U.S. Cl.
CPC .......... *C08F 283/10* (2013.01); *C09J 151/08* (2013.01)

(58) Field of Classification Search
CPC ...... C08F 283/10; C09J 151/08; C09J 177/06; C09J 163/00; C08G 69/265; C08G 69/40; C08G 59/54
See application file for complete search history.

(56) References Cited

U.S. PATENT DOCUMENTS

| | | | | |
|---|---|---|---|---|
| 3,565,861 | A | 2/1971 | White et al. | |
| 4,128,525 | A | 12/1978 | Yeakey et al. | |
| 4,503,161 | A | 3/1985 | Korbel et al. | |
| 4,503,211 | A | 3/1985 | Robins | |
| 4,814,415 | A * | 3/1989 | Sellstrom | C08G 59/54 528/111 |
| 4,853,456 | A | 8/1989 | Sellstrom et al. | |
| 5,731,369 | A | 3/1998 | Mahoney | |
| 8,491,749 | B2 | 7/2013 | Gorodisher et al. | |
| 8,637,614 | B2 | 1/2014 | Gorodisher et al. | |
| 10,196,548 | B2 | 2/2019 | Rasmussen et al. | |
| 2011/0130518 | A1 * | 6/2011 | Gorodisher | C07C 233/56 525/119 |

FOREIGN PATENT DOCUMENTS

| | | | | |
|---|---|---|---|---|
| CN | 106432717 | A * | 2/2017 | C08G 69/40 |
| EP | 0329266 | A2 | 8/1989 | |
| WO | 2011087650 | A1 | 7/2011 | |
| WO | 2015175583 | A1 | 11/2015 | |
| WO | 2021198829 | A1 | 10/2021 | |
| WO | 2022090842 | A1 | 5/2022 | |

OTHER PUBLICATIONS

International Search Report for PCT International Application No. PCT/IB2022/051066, mailed on Apr. 22, 2022, 3 pages.

* cited by examiner

*Primary Examiner* — Kumar R Bhushan
(74) *Attorney, Agent, or Firm* — Adrian L. Pisko

(57) ABSTRACT

A two-part curable composition is provided that includes a first part that includes an oxamido-containing compound and a second part that includes an epoxy resin. The oxamido-containing compound includes at least one first segment derived from a first polyamine and at least one second segment derived from a second polyamine that is different than the first polyamine. The oxamido-containing compound has at least two amino (—$NH_2$) groups that can react with the epoxy resin in the second part of the curable composition. Each part of the curable composition is flowable, often at room temperature or slightly above room temperature, and can be mixed to form a cured composition having structural bonding performance.

15 Claims, No Drawings

AMINE-TERMINATED OXAMIDE CURATIVES

BACKGROUND

Two-part curable compositions are known that form a polyurethane upon curing. The cured composition can be used as an adhesive, sealant, or coating. A first part of these curable compositions contains an isocyanate-terminated compound while a second part contains a polyol. When combined, the isocyanate groups react with the polyol to form carbamate groups. While this is established and effective chemistry, the curable compositions are sensitive to moisture and can raise health, safety, and regulatory concerns due to the presence of the isocyanate-terminated compound. Alternatives to the use of isocyanate-containing curatives are needed.

Various two-part curable compositions containing a polyamine and an epoxy resin are known and have been used for bonding together various surfaces. However, the cured product resulting from these two-part curable compositions often lack the flexibility, elongation, and toughness performance of polyurethanes.

SUMMARY

For two-part curable compositions, it is desirable that each part is flowable at the desired application temperature (e.g., 20 to 40 degrees Celsius) to allow for sufficient mixing of the two parts and for wetting the surface of the substrate to which is it applied. To provide a curable composition that has a relatively low viscosity in the absence of a solvent (or in the presence of a minimum amount of a solvent), the curable composition needs to be selected to have minimum crystallinity and a sufficiently low molecular weight yet being capable of curing into an effective polymeric network. Through a combination of different polyamines, an oxamido-containing compound can be formed that can be used as a flowable curative for epoxy resins.

In a first aspect, a two-part curable composition is provided. A first part of the two-part curable composition contains an oxamido-containing compound with at least two —$NH_2$ groups, with the oxamido-containing compound comprising at least one group of Formula (I) and at least one group of Formula (II).

$$*—(CO)—(CO)—NH—R^1—NH—* \quad (I)$$

$$*—(CO)—(CO)—NH—R^2—NH—* \quad (II)$$

The group $R^1$ is the residue of a first polyamine of formula $H_2N—R^1—NH_2$ minus two —$NH_2$ groups and $R^2$ is the residue of a second polyamine of formula $H_2N—R^2—NH_2$ minus two —$NH_2$ groups. In Formula (I), the group $R^1$ is a (hetero)hydrocarbylene having a first carbon atom bonded to a first —NH— group and a second carbon atom bonded to a second —NH— group where the first carbon atom and the second carbon atom are independently either a tertiary or quaternary carbon atom. In most embodiments, both the first and second carbon atoms are tertiary carbon atoms. In Formula (II), the group $R^2$ is a (hetero)hydrocarbylene having a first carbon atom bonded to a first —NH— group and a second carbon bonded to a second —NH— group where both the first carbon atom and the second carbon atom are secondary carbon atoms. An asterisk (*) indicate an attachment site to another group in the oxamido-containing compound. A second part of the two-part curable composition contains an epoxy resin.

In a second aspect, a curable composition is provided that comprises a reaction product of the two-part curable composition described in the first aspect.

DETAILED DESCRIPTION

A two-part curable composition is provided that includes a first part that includes an oxamido-containing compound and a second part that includes an epoxy resin. The oxamido-containing compound includes at least one first segment derived from a first polyamine and at least one second segment derived from a second polyamine that is different than the first polyamine. The oxamido-containing compound has at least two amino (—$NH_2$) groups that can react with the epoxy resin in the second part of the curable composition. Each part of the curable composition is flowable, often at room temperature or slightly above room temperature (e.g., temperatures in a range of about 20 to about 40 degrees Celsius) and can be mixed to form a cured composition having structural bonding performance.

The terms "a", "an", and "the" are used interchangeably with "at least one" to mean one or more of the elements being described.

The term "and/or" means either or both. For example, the expression X and/or Y means X, Y, or a combination thereof (both X and Y).

The term "alkyl" refers to a monovalent group that is a radical of an alkane and includes groups that are linear, branched, cyclic, bicyclic, or a combination thereof. Unless otherwise indicated, the alkyl groups typically contain 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Branched and cyclic alkyl groups have at least 3 carbon atoms and bicyclic alkyl groups typically have at least 7 carbon atoms. Example alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene groups typically contain 1 to 30 carbon atoms. In some embodiments, the alkylene groups contain 1 to 20 carbon atoms, 1 to 10 carbon atoms, 1 to 6 carbon atoms, 1 to 4 carbon atoms, or 1 to 3 carbon atoms. Branched and cyclic alkylene groups have at least 3 carbon atoms and bicyclic alkylene groups typically have at least 7 carbon atoms. Example alkylene groups include, but are not limited to, methylene, ethyl, n-propylene, n-butylene, n-pentylene, isobutylene, t-butylene, isopropylene, n-octylene, n-heptylene, ethylhexylene, cyclopentylene, cyclohexylene, cycloheptylene, adamantylene, norbornylene, and the like.

The term "aromatic" refers an unsaturated group or compound that typically has 3 to 40 carbon atoms or 3 to 30 carbon atoms. The aromatic group or compound is usually carbocyclic or heterocyclic containing one or more of the heteroatoms (O, N, or S). The aromatic ring can have one ring or can have multiple fused rings that are each carbocyclic or heterocyclic.

The term "aryl" refers to a monovalent group that is aromatic and carbocyclic. The aryl has at least one aromatic ring. Optionally, the aromatic ring can have one or more additional carbocyclic rings that are fused to the aromatic ring. Any additional rings can be unsaturated, saturated, or aromatic. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of aryl groups include phenyl, naphthyl, biphenyl, phenanthryl, and anthracyl.

The term "arylene" refers to a divalent group that is aromatic and carbocyclic. The arylene has at least one aromatic ring. Optionally, the aromatic ring can have one or more additional carbocyclic rings that are fused to the aromatic ring. Any additional rings can be unsaturated, saturated, or aromatic. Unless otherwise indicated, the arylene groups typically contain from 6 to 30 carbon atoms. In some embodiments, the arylene groups contain 6 to 20, 6 to 18, 6 to 16, 6 to 12, or 6 to 10 carbon atoms. Examples of arylene groups include phenylene, naphthylene, biphenylene, phenanthrylene, and anthracylene.

The term "aralkyl" refers to a monovalent group that is an alkyl group substituted with an aryl group (e.g., as in a benzyl group); the aralkyl group can be considered as being an alkylene bonded to an aryl. Unless otherwise indicated, the alkyl (or alkylene) portion often has 1 to 10 carbon atoms, 1 to 6 carbon atoms, or 1 to 4 carbon atoms and the aryl portion often has 6 to 20 carbon atoms, 6 to 18 carbon atoms, 6 to 16 carbon atoms, 6 to 12 carbon atoms, or 6 to 10 carbon atoms.

The term "alkaryl" refers to a monovalent group that is an aryl substituted with an alkyl group (e.g., as in a tolyl group); the alkaryl can be considered as being an arylene bonded to an alkyl. Unless otherwise indicated, the alkyl portion often has 1 to 10 carbon atoms, 1 to 6 carbon atoms, or 1 to 4 carbon atoms and an aryl (or arylene) portion often has 6 to 20 carbon atoms, 6 to 18 carbon atoms, 6 to 16 carbon atoms, 6 to 12 carbon atoms, or 6 to 10 carbon atoms.

The term "curable" refers to a composition or component that can be cured. The terms "cured" and "cure" refer to joining polymeric chains together by covalent chemical bonds, usually via crosslinking molecules or groups, to form a polymeric network. A cured polymeric network is generally characterized by insolubility, but it may be swellable in the presence of an appropriate solvent.

The term "curable component(s)" as used herein refers to the curable composition minus any optional additives such as fillers that may be present. As used herein, the curable components include, but are not limited to, the epoxy resin, the oxamido-containing compound, and other polyamines or amines.

The term "curable composition" refers to a total reaction mixture that is subjected to curing. The curable composition includes the curable components and any optional additives. The curable composition is a mixture of both the first part composition and the second part composition.

The term "cured composition" refers to the reaction product of the curable composition. The cured composition is often a structural adhesive.

The term "hydrocarbyl" refers to a monovalent group that contains only hydrogen and carbon atoms and that can be saturated, partially unsaturated, or aromatic.

The term "hydrocarbylene" refers to a divalent group that contains only hydrogen and carbon atoms and that can be saturated, partially unsaturated, or aromatic and can be linear, branched, cyclic, or a combination thereof.

The term "(hetero)hydrocarbylene" refers to a divalent group that can be either a hydrocarbylene or a heterohydrocarbylene. A hydrocarbylene contains only carbon and hydrogen while a heterohydrocarbylene can contain one or more heteroatoms that are typically oxygen, sulfur, or nitrogen. Heterohydrocarbylene groups can include one or more —O—, —S—, —NR—, —(CO)—O—, —(CO)—NR—, or —(CO)—S— groups where R is hydrogen, alkyl, aryl, alkaryl, or aralkyl. The (hetero)hydrocarbylene can be saturated, partially unsaturated, or aromatic and can be linear, branched, cyclic, or a combination thereof. The (hetero)hydrocarbylene typically does not include silicon atoms or fluorine atoms.

The term "oxamido-containing compound" refers to a compound having at least one group —NH—(CO)—(CO)—NH—. In most embodiments, there are at least 2, at least 3 or even more oxamido groups.

The term "polyamine" refers to a compound that has at least two groups of formula $—NH_2$. The polyamine can be polymeric or non-polymeric.

The term "secondary carbon atom" refers to a carbon atom bonded to two hydrogen atoms. For example, the carbon attached to the $—NH_2$ group in the compound $H_2N—CH_2—CH_3$ is a secondary carbon atom.

The term "tertiary carbon atom" refers to a carbon atom bonded to one hydrogen atom. For example, the carbon attached to the $—NH_2$ group in the compound $H_2N—CH(CH_3)_2$ is a tertiary carbon atom.

The term "quaternary carbon atom" refers to a carbon atom that is not bonded to a hydrogen atom. For example, the carbon attached to the $—NH_2$ group in the compound $H_2N—C(CH_3)_3$ is a quaternary carbon atom.

The terms "first part composition" and "first part" are used interchangeably to refer to the portion of the curable composition that contains at least one or more curing agents (i.e., a curing agent refers to a compound having multiple $—NH_2$ groups) for an epoxy resin.

The "second part composition" and "second part" are used interchangeably is the portion of the portion of the curable composition that contains at least the epoxy resin.

The term "room temperature" refers to a temperature ranging from 20 to 25 degrees Celsius or 22 to 25 degrees Celsius.

The phrase "in a range of", "ranging from", or a similar phrase refers to all values within the stated range plus the endpoints of the range.

As used herein, any statement of a range includes the endpoint of the range and all suitable values within the range (e.g., 1 to 5 includes 1, 1.5, 2, 2.75, 3, 3.80, 4, 5, etc.).

Curable Composition

First Part Composition

The first part of the curable composition contains an oxamido-containing compound. The oxamido-containing compound has a plurality of oxamido groups of formula —NH—(CO)—(CO)—NH—. The oxamido-containing compound has at least one first segment that is derived from a first polyamine and at least one second segment that is derived from a second polyamine that is different than the first polyamine. Further, the oxamido-containing compound has at least two $—NH_2$ groups that can react with the epoxy resin in the second part of the curable composition.

The oxamido-containing compound has at least one group of Formula (I) and at least one group of Formula (II).

$$*\text{—(CO)—(CO)—NH—}R^1\text{—NH—}* \quad \text{(I)}$$

$$*\text{—(CO)—(CO)—NH—}R^2\text{—NH—}* \quad \text{(II)}$$

In Formula (I), the group $R^1$ is the residue of a first polyamine of formula $H_2N—R^1—NH_2$ minus two $—NH_2$ groups. In Formula (II), the group $R^2$ is the residue of a second polyamine of formula $H_2N—R^2—NH_2$ minus two $—NH_2$ group where the second polyamine is different than the first polyamine (i.e., $R^2$ is different than $R^1$). As indicated by Formulas (I) and (II), the oxamido-containing compound has at least one first segment ($—HN—R^1—NH—$) derived from the first polyamine and at least one second segment ($—HN—R^2—NH—$) derived from the second polyamine. Each asterisk (*) indicates an attachment site to another group in the oxamido-containing compound.

Group $R^1$ is a (hetero)hydrocarbylene group and can optionally contain additional $—NH_2$ groups. In Formula (I), group $R^1$ has a first carbon atom bonded to a first —NH— group and a second carbon atom bonded to a second —NH— group where the first carbon atom and the second carbon atom are each independently a tertiary or quaternary carbon atoms. In most embodiments, the first carbon atom and the second carbon atoms are both tertiary carbon atoms. Group $R^2$ is a (hetero)hydrocarbylene group and can optionally contain additional $—NH_2$ groups. In Formula (II), group $R^2$ has a first carbon atom bonded to a first —NH— group and a second carbon atom bonded to a second —NH— group where both the first carbon atom and the second carbon atom are secondary carbon atoms.

The first polyamine of formula $H_2N—R^1—NH_2$ can be any suitable polyamine with at least two $—NH_2$ groups that are sterically hindered. That is, the $R^1$ group of the first polyamine can have a first carbon atom bonded to a first $—NH_2$ group and a second carbon atom bonded to a second $—NH_2$ group where the first carbon atom and the second carbon atom are each independently a tertiary or quaternary carbon atom. Usually, both the first and second carbon atoms are tertiary carbon atoms. An amino group ($—NH_2$) bonded to a tertiary or quaternary carbon atom tends to react with the oxalate compound more slowly than an amino group bonded to a secondary carbon atom due to increased steric hinderance. The group $R^1$ can be a hydrocarbylene or a heterocarbylene. In many embodiments, it is a heterocarbylene with nitrogen and/or oxygen heteroatoms. The heterocarbylene groups are often polyether groups having multiple alkylene oxide groups.

Suitable examples of the first polyamine include, but are not limited to, various difunctional amine-terminated polyethers that are available under the trade designation JEFFAMINE D, and JEFFAMINE ED from Huntsman Corporation (The Woodlands, TX, USA). These first polyamines typically have two amino groups bonded to a tertiary carbon atom. Examples include JEFFAMINE D-230, D-200, D-400, ED-600, ED-900, and ED-2003 where the number is indicative of the molecular weight (e.g., weight average molecular weight). Other polyether amines are available from Huntsman Corporation under the trade designation JEFFAMINE THF such as JEFFAMINE THF-100 with a molecular weight of about 1000 grams/mole and THF-170 with a molecular weight (e.g., weight average molecular weight) of about 1700 grams/mole (e.g., weight average molecular weight). Still others include those commercially available from EVONIK (Essen, Germany) under the trade designation VERSALINK P such as VERSALINK P-650 and VERSALINK P-1000.

The first polyamine can have more than two amino ($—NH_2$) groups. In some embodiments, the first polyamine is a trifunctional amine-terminated polyethers such as those that are available under the trade designation JEFFAMINE T from Huntsman Corporation. These include JEFFAMINE T-403, T-3000, and T-5000 where the number is indicative of the molecular weight (weight average molecular weight for a polymer). These first polyamines typically have three amino groups bonded to tertiary carbon atoms.

The first polyamine usually has a higher molecular weight than the second polyamine. In some embodiments, the molecular weight (or weight average molecular weight (Mw) for a polymer) is in a range greater than 225 to 5000 grams/mole but compounds outside this range can be used in some applications provided that the first part composition is a fluid. The molecular weight (or Mw) can be greater than 225 grams/mole, at least 230 grams/mole, at least 250 grams/mole at least 275 grams/mole, at least 300 grams/mole, at least 350 grams/mole at least 400 grams/mole, at least 450 grams/mole, at least 500 grams/mole, at least 750 grams/mole, or at least 1000 grams/mole and up to 5000 grams/mole or even higher, up to 4500 grams/mole, up to 4000 grams/mole, up to 3500 grams/mole, up to 3000 grams/mole, up to 2500 grams/mole, up to 2000 grams/mole, up to 1500 grams/mole, or up to 1000 grams/mole.

The second polyamine of formula $H_2N—R^2—NH_2$ can be any suitable polyamine with at least two $—NH_2$ groups that are not sterically hindered. That is, the $R^2$ group of the second polyamine can have a first carbon atom bonded to a first $—NH_2$ group and a second carbon atom bonded to a second $—NH_2$ group where both the first carbon atom and the second carbon atom are secondary carbon atoms. An amino group ($—NH_2$) bonded to a secondary carbon atom tends to react with the oxalate compound more readily than an amino group bonded to a tertiary carbon atom due to decreased steric hinderance. The group $R^2$ can be a hydrocarbylene or a heterocarbylene with nitrogen and/or oxygen heteroatoms.

Suitable examples of the second polyamine include, but are not limited to, ethylene diamine, propylene diamine, butylene diamine, 2-methylpentane-1,5-diamine, 1,6-hexanediamine, 1,8-octanediamine, 1,10-decanediamine, 1,12-dodecanediamine, 4,7,10-trioxa-1,13-tridecanediamine (TTD), bis(aminomethyl)cyclohexane, octahydro-4,7-methano-1H-indenedimethylamine (available under the trade designation TCD DIAMINE from Oxea, Dallas, Tex.), bis(aminoethyl)benzene, 3,6-dioxaoctane-1,8-diamine, xylene diamine, diethylene triamine, triethylene tetramine, bis(aminomethyl)norbornane, dipropylene triamine, tetraethylene pentaamine, and hexaethylene heptamine.

The second polyamine often has a molecular weight (or weight average molecular weight for a polymer) in a range of 60 to 225 grams/mole. The molecular weight (or Mw) is often at least 60 grams/mole, 80 gram/mole, at least 100 gram/mole, at least 120 gram/mole, at least 140 grams/mole, at least 150 grams/mole, at least 160 grams/mole, at least 180 grams/mole, or at least 200 grams/mole and up to 225 grams/mole, up to 220 grams/mole up to 210 grams/mole, up to 200 grams/mole, up to 180 grams/mole, up to 160 grams/mole, up to 150 grams/mole, up to 140 grams/mole, up to 120 grams/mole, or up to 100 grams/mole.

The oxamido-containing compound can be formed using a variety of methods. For example, in a first preparation method, a mixture of a first polyamine of formula $H_2N—R^1—NH_2$ and a second polyamine $H_2N—R^2—NH_2$ are reacted with an oxalate compound. In a second method, the first and second polyamines are reacted sequentially with the oxalate compound. The molar ratio of the oxalate compound to the polyamine compounds are selected so that the product has terminal $—NH_2$ groups.

The oxalate compound is typically of Formula (III)

$$R^4O—(CO)—(CO)—OR^4 \tag{III}$$

where $R^4$ is a hydrocarbyl. In many embodiments, $R^4$ is an alkyl, aryl, aralkyl, or alkaryl. Suitable alkyl groups often have 1 to 10 carbon atoms, 1 to 6 carbon atoms, or 1 to 4 carbon atoms. Suitable aryl groups typically have 6 to 10 carbon atoms. The aryl is often phenyl. Suitable aralkyl groups often have an aryl group with 6 to 10 carbon atoms (e.g., phenyl) and an alkylene group with 1 to 10 carbon atoms. The aralkyl is often benzyl. Suitable alkaryl groups often have an arylene group with 6 to 10 carbon atoms (e.g., phenylene) and an alkyl group with 1 to 10 carbon atoms. The alkaryl is often tolyl.

Oxalate compounds of Formula (III) can be prepared, for example, by reacting an alcohol of formula $R^4—OH$ with oxalyl dichloride. Oxalate compounds that are commercially available include, but are not limited to, dimethyl oxalate, diethyl oxalate, di-n-butyl oxalate, di-tert-butyl oxalate, diisopropyl oxalate, dipropyl oxalate, dipentyl oxalate, tert-butyl ethyl oxalate, tert-butyl methyl oxalate, bis(4-methylbenzyl) oxalate, isobutyl octan-2-yl oxalate, dibenzyl oxalate, and bis(phenyl) oxalate.

If both the first polyamine and the second polyamine are combined and reacted together with the oxalate compound, the resulting product tends to have segments derived from whichever polyamine reacts slower with the oxalate at the terminal positions. Because the second polyamine usually tends to react more quickly than the first polyamine because the amino groups of the second polyamine are often less sterically hindered and/or because the molecular weight of the second polyamine is often lower than the first polyamine, the reaction product tends to have segments from the first polyamine at the terminal positions. For example, if equimolar amount of the first and second polyamine were used, the reaction product is often predominately of Formula (IV) as shown in Reaction Scheme A.

Reaction Scheme A $$3\ R^4O—(CO)—(CO)—OR^4 \ + \ 2\ H_2N—R^1—NH_2 \ + \ 2\ H_2N—R^2—NH_2 \longrightarrow$$

$$H_2N—R^1—NH—(CO)—(CO)—NH—R^2—NH—(CO)—(CO)—NH—R^2—NH—(CO)—(CO)—NH—R^1—NH_2 \ + \ 6\ R^4OH \tag{IV}$$

If the terminal segments derived from the first polyamine contain sterically hindered $—NH_2$ groups, the curable composition may not cure as rapidly when mixed with an epoxy resin as a reaction product that has terminal segments derived from the second polyamine. Further, because the first polyamine often has a higher molecular weight, it can be preferable in some applications to have a first polyamine segment ($—NH—R^1—NH—$) in the inner potion of the oxamido-containing compound if preparing a final cured product where good elongation characteristics are desired.

Thus, in some embodiments, the first and second polyamines are reacted individually in a stepwise manner with the oxalate compound so that the structure of the resulting oxamido-containing compound can be selected based on the desired characteristics. For example, the less reactive first polyamine of formula $H_2N—R^1—NH_2$ is often reacted first with a molar excess of the oxalate compound relative to available amino groups ($—NH_2$) to form a first intermediate with terminal ester groups that is predominately of Formula (V).

$$R^4O—[(CO)—(CO)—NR—R^1—NH]_x—(CO—(CO)—OR^4 \tag{V}$$

In Formula (V), $R^1$ and $R^4$ are the same as described above and x is an integer in a range of 1 to 5. This first intermediate is then reacted with the second polyamine $H_2N—R^2—NH_2$. Additional oxalate compound of formula $R^4O—(CO)—(CO)—OR^4$ optionally can be added as well but there is usually a molar excess of amino groups ($—NH_2$) compared to ester groups in the reaction mixture.

The product of this reaction is an oxamido-containing compound that has at least one group of Formula (I), at least one group of formula (II), and two terminal groups of formula $—NH—R^2—NH_2$.

$$*—(CO)—(CO)—NH—R^1—NH—* \tag{I}$$

$$*—(CO)—(CO)—NH—R^2—NH—* \tag{II}$$

The oxamido-containing compound typically has one or more monomeric units of Formula (I) in the inner portion of the compound with the monomeric units of Formula (II) in the outer portions of the compound and optionally further in the inner portions of the compound.

For ease of discussion, the monomeric unit of Formula (I) may be designated as $Q^1$ and the monomeric unit of Formula (II) may be designated as $Q^2$. In some examples, the oxamido-containing compound may have a group of Formula (VI-1) or (VI-2) where x is an integer in a range of 1 to 5.

$$*—[Q^2]—[Q^1]_x—[Q^2]—* \tag{VI-1}$$

$$*—[Q^2]—[Q^1]_x—[Q^2]—[Q^1]_x—[Q^2]—* \tag{VI-2}$$

Some oxamido-containing compounds having a group of Formula (VI-1) or (VI-2) may be of Formula (X-1) or (X-2).

$$NH_2—R^2—NH—[Q^2]_w—[Q^1]_x—[Q^2]_yH \quad (X\text{-}I)$$

$$NH_2—R^2—NH—[Q^2]_w—[Q^1]_x—[Q^2]—[Q^1]_x—[Q^2]_y—H \quad (X\text{-}2)$$

In Formulas (VI-1) (VI-2), (X-2), and (X-2), the variable w is an integer in a range of 0 to 5, the variable x is an integer in a range of 1 to 5, and the variable y is an integer in a range of 1 to 5. The variable w is often equal to 0, 1 or 2, the variable x is often equal to 2 or 3, and the variable y is often equal to 1 to 2.

There can be a plurality of different first polyamines and/or a plurality of different second polyamines used to prepare the oxamido-containing compound of Formula (VI). Thus, if the variables w, x, and y are greater than 1, the multiple $R^1$ and/or $R^2$ groups may be the same or different.

There can be a plurality of different compounds of Formula (VI) in the first part that have different values for at least one of the variables w, x, and y. Of the plurality of different compounds of Formula (VI) in the first part, the average number of oxamido groups is usually in a range of 2 to 15. In some examples, the average number of oxamido groups is at least 2, at least 3, at least 4, at least 5, or at least 6 and up to 15, up to 14, up to 12, up to 10, up to 8, up to 7, up to 6, or up to 5. In same examples, the average number of oxamido groups is in a range of 2 to 7, 2 to 6, 2 to 5, 3 to 7, 3 to 6, or 3 to 5.

In some embodiments, an optional third polyamine of formula $H_2N—R^3—NH_2$ can be used in the preparation of the oxamido-containing compound. If used, the oxamido-containing compound contains at least one group of Formulas (I), (II), and (VII).

$$*—(CO)—(CO)—NH—R^1—NH—* \quad (I)$$

$$*—(CO)—(CO)—NH—R^2—NH—* \quad (II)$$

$$*—(CO)—(CO)—NH—R^3—NH—* \quad (VII)$$

Formulas (I) and (II) are the same as described above. In Formula (VII), the $R^3$ group is the residual of the third polyamine minus two $—NH_2$ groups. The group $R^3$ can be a hydrocarbylene or a heterocarbylene with nitrogen and/or oxygen heteroatoms. The third polyamine can be of a first type of a second type.

In the first type, the third polyamine has a first $—NH_2$ group bonded to a first carbon atom and a second $—NH_2$ group bonded to a first second carbon atom with both the first carbon atom and the second carbon atoms being secondary carbon atoms. The first type of the third polyamine has a molecular weight (or weight average molecular weight for a polymer) that is greater than 225 grams/mole. The molecular weight (or weight average molecular weight) of the third polyamine is often in a range greater than 225 to 750 grams/mole. For example, the molecular weight is at least 225, at least 230, at least 250, at least 275, at least 300, at least 350, or at least 400 grams/mole and up to 750, up to 700, up to 650, up to 600, up to 550, up to 500, up to 450, or up to 400 grams/mole. Example third polyamines include, but are not limited to, dimer diamines such as those commercially available from CRODA (Princeton, NJ, USA) under the trade designation PRIAMINE (e.g., PRIAMINE 1074, 1075, and 1071) can be used.

In the second type, the third polyamine has a first $—NH_2$ group bonded to a first carbon atom that is a secondary carbon atom and a second $—NH_2$ group bonded to a second carbon atom that is either a tertiary carbon atom or a quaternary carbon atom. The second $—NH_2$ group is usually bonded to a tertiary carbon atom. The second type of the third polyamine has a molecular weight (or weight average molecular weight for a polymer) that is at least 100 grams/mole. The molecular weight (or weight average molecular weight) of the second type of third polyamine is often in a range greater than 100 to 750 grams/mole. For example, the molecular weight is at least 100, at least 125, at least 150, at least 175, at least 200, at least 300, at least 350, or at least 400 grams/mole and up to 750, up to 700, up to 650, up to 600, up to 550, up to 500, up to 450, or up to 400 grams/mole. An example of the second type of the third polyamine is isophorone.

If used in a stepwise synthesis of the oxamido-containing compound, the third polyamine is added either before or after addition of the first polyamine. The second polyamine is typically added last. The product of this reaction is an oxamido-containing compound that has at least one group of Formula (I), at least one group of formula (II), at least one group of Formula (VII), and two terminal groups of formula $—NH—R^2—NH_2$.

$$*—(CO)—(CO)—NH—R^1—NH—* \quad (I)$$

$$*—(CO)—(CO)—NH—R^2—NH—* \quad (II)$$

$$*—(CO)—(CO)—NH—R^3—NH—* \quad (VII)$$

The oxamido-containing compound typically has one or more monomeric units of Formula (I) and (VII) in the inner portion of the compound with the monomeric units of Formula (II) in the outer portions of the compound and optionally further in the inner portions of the compound.

Similar to the oxamido-containing compound of Formula (VI), there can be a plurality of different first polyamines and/or a plurality of different second polyamines and/or a plurality of different third polyamines used to prepare the oxamido-containing compound of Formula (VIII). Thus, if the variables w, x, y, and z are greater than 1, the multiple $R^1$ and/or $R^2$ groups and/or $R^3$ groups may be the same or different.

The first part typically contains at least 35 to 100 weight percent of the oxamido-containing compound based on a total weight of curable components in the first part. This amount can be at least 35 weight percent, at least 40 weight percent, at least 45 weight percent, at least 50 weight percent, at least 55 weight percent, at least 60 weight percent, at least 65 weight percent, or at least 70 weight percent and up to 100 weight percent, up to 95 weight percent, up to 90 weight percent, up to 85 weight percent, up to 80 weight percent, up to 75 weight percent, or up to 70 weight percent based on the total weight of curable components in the first part.

In addition to the oxamido-containing compound, the first part can contain a fourth polyamine that does not have an oxamido group. The fourth polyamine can be any polyamine described above for use as a first polyamine, second polyamine, or third polyamine. If the fourth polyamine is a first, second, or third polyamine, it can be the same or different from those used to prepare the oxamido-containing compound. The fourth polyamines can be added, for example, to decrease the viscosity of the first part and/or increase the volume of the first part. As such, the molecular weight (or weight average molecular weight for a polymer) is often no greater than 1000 gram/mole.

The amount of the fourth polyamine in the first part is usually in a range of 0 to 65 weight percent based on the total weight of curable components in the first part. The amount can be at least 1 weight percent, at least 2 weight percent, at least 5 weight percent, at least 10 weight percent, at least 15 weight percent, at least 20 weight percent, at least 25 weight percent, or at least 30 weight percent and up to 65 weight percent, up to 60 weight percent, up to 75 weight percent, up to 70 weight percent, up to 45 weight percent, up to 40 weight percent, up to 35 weight percent, up to 30 weight percent, up to 25 weight percent, up to 20 weight percent, up to 15 weight percent, or up to 5 weight percent.

Further, the first part can contain an amine compound having a single —$NH_2$ group. The presence of such an amine can reduce the amount of crosslinking within the cured composition. Suitable amines that can be used include, for example, polyether monoamines where the polyether is typically polypropylene glycol or polyethylene glycol. Examples include, but are not limited to, those commercially available from Huntsman under the trade designation JEFFAMINE M (e.g., JEFFAMINE M-600, M-205, M-1000, M-2070, M-2095, and M-3085 where the number corresponds to the molecular weight (e.g., weight average molecular weight)).

The amount of the amine compound having a single —$NH_2$ group is often in a range of 0 to 10 weight percent based on the total weight of curable components in the first part. The amount can be at least 0.1 weight percent, at least 0.5 weight percent, at least 1 weight percent, at least 2 weight percent, or at least 3 weight percent and up to 10 weight percent, up to 8 weight percent, up to 6 weight percent, or up to 5 weight percent based on the total weight of curable components in the first part.

Overall, the first part often has an active amine hydrogen equivalent weight in a range of 300 to 10,000 grams/equivalent. As used herein, the term "active amine hydrogen" refers only to hydrogen atoms in —$NH_2$ groups and not to those in the —NH— groups along the length of the polyamine and/or oxamido-containing compound that typically do not react or react only very slowly with an epoxy resin. The active amine hydrogen equivalent weight is often at least 300 grams/equivalent, at least 400 grams/equivalent, at least 500 grams/equivalent, at least 600 grams/equivalent, at least 700 grams/equivalent, at least 800 grams/equivalent, or at least 1000 grams/equivalent and up to 10,000 grams/equivalent, up to 8000 grams/equivalent, up to 6000 grams/equivalent, up to 4000 grams/equivalent, up to 3000 grams/equivalent, up to 2500 grams/equivalent, up to 2000 grams/equivalent, up to 1500 grams/equivalent, or up to 1000 grams/equivalent.

The first part can optionally further include a curing catalyst. Examples of curing catalysts include phenols substituted with tertiary amino groups, bis-substituted urea compounds, sulfonic acid compounds or salts thereof, imidazoles or salts thereof, imidazolines or salts thereof, and Lewis acids. These compounds often accelerate reaction of the polyamines discussed above.

Some curing catalysts are phenols substituted with tertiary amino groups such as those of Formula (IX).

(IX)

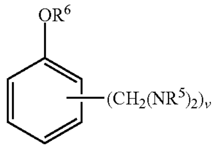

In Formula (IX), each group $R^5$ is independently an alkyl. The variable v is an integer equal to 2 or 3. Group $R^6$ is hydrogen or alkyl. Suitable alkyl groups for $R^6$ and $R^5$ often have 1 to 12 carbon atoms, 1 to 8 carbon atoms, 1 to 6 carbon atoms, or 1 to 4 carbon atoms. One exemplary secondary curative of Formula (IV) is tris-2,4,6-(dimethylaminomethyl)phenol that is commercially available under the trade designation ANCAMINE K54 from Evonik Corporation (Essen, North Rhine-Westphalia, Germany).

Another class of curing catalyst includes substituted ureas such as, for example, bis-substituted ureas. Examples include, but are not limited to, 4,4'-methylene bis(phenyl dimethyl) urea, toluene diisocyanate urea, 3-(4-chlorophenyl)-1,1-dimethylurea, and various compounds that are commercially available from CVC Thermoset Specialties (Moorestown, NJ, USA) under the trade designation OMICURE (e.g., OMICURE U-35 (which is a cycloaliphatic bis urea), U-52, and U-52M).

Yet another class of curing catalyst includes various sulfonic acidic compounds and salts thereof, such as those commercially available under the trade designation NACURE from King Industries, Inc. (Norwalk, CT, USA).

Further compounds suitable for use as curing catalysts for epoxy resins are Lewis acids. Example Lewis acids include, but are not limited to, boron trifluoride ($BF_3$), boron trichloride ($BCl_3$), zinc chloride ($ZnCl_2$), stannic chloride ($SnCl_4$), antimony pentachloride ($SbCl_5$), antimony pentafluoride ($SbF_5$), ferric chloride ($FeCl_3$), aluminum trichloride ($AlCl_3$), arsenic pentafluoride ($AsF_5$), calcium nitrate ($Ca(NO_3)_2$), calcium triflate ($Ca(CF_3SO_3)_2$), and phosphorous pentafluoride ($PF_5$). Due to their high reactivity, the Lewis acids are often complexed with a nitrogen-containing compound and/or with a hydroxy-containing compound. The molar ratio of the Lewis acid to the complexing agent is typically about 1:1 but can be higher depending on the specific Lewis acid and the selected complexing agent. Methods of preparing the Lewis acid complexes are described, for example, in U.S. Pat. No. 3,565,861 (White et al.), U.S. Pat. No. 4,503,161 (Korbel et al.), U.S. Pat. No. 4,503,211 (Robins), and U.S. Pat. No. 5,731,369 (Mahoney).

Second Part Composition

The second part of the curable composition contains an epoxy resin. Any suitable epoxy resin can be used in the second part composition, but it typically has at least two glycidyl groups. In most embodiments, the epoxy resins are liquids at temperatures less than about 40 degrees Celsius such as at room temperature (e.g., 20 to 25 degrees Celsius). A mixture of different epoxy resins can be used, including solid epoxy resins, if the second part is a liquid at temperatures less than 40 degrees Celsius such as at room temperature.

Suitable epoxy resins may include aromatic polyepoxide resins (e.g., a chain-extended diepoxide or novolac epoxy resin having at least two epoxide groups), aromatic monomeric diepoxides, aliphatic polyepoxide, or aliphatic monomeric diepoxides. The aromatic polyepoxide or aromatic monomeric diepoxide typically contains at least one (e.g., in a range of 1 to 6, 1 to 4, 2 to 6, or 2 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Examples of aromatic epoxy resins may include novolac epoxy resins (e.g., phenol novolacs, ortho-, meta-, or epoxy resin para-cresol novolacs, or combinations thereof), bisphenol epoxy resins (e.g., bisphenol A, bisphenol F, halogenated bisphenol epoxies, and combinations thereof), resorcinol epoxy resins, tetrakis phenylolethane epoxy resins, and combinations of any of these. Useful epoxy compounds include diglycidyl ethers of difunctional phenolic compounds (e.g., p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane). In some embodiments, the epoxy resin includes a bisphenol diglycidyl ether, wherein the bisphenol (i.e., $-O-C_6H_5-CH_2-C_6H_5-O-$ group) may be unsubstituted (e.g., bisphenol F), or wherein either of the phenyl rings or the methylene group may be substituted by one or more halogens (e.g., fluoro, chloro, bromo, iodo), methyl groups, trifluoromethyl groups, or hydroxymethyl groups.

Examples of aromatic monomeric diepoxides useful as the epoxy resin include, but are not limited to, the diglycidyl ether of bisphenol A, the diglycidyl ether of bisphenol F, and mixtures thereof. Bisphenol epoxy resins, for example, may be chain extended to have any desirable epoxy equivalent weight. Chain extending epoxy resins can be carried out by reacting a monomeric diepoxide, for example, with a bisphenol in the presence of a catalyst to make a linear polymer.

The aromatic epoxy resin (e.g., either a bisphenol epoxy resin or a novolac epoxy resin) often has an epoxy equivalent weight of at least 150 grams per equivalent, 170 grams per equivalent, 200 grams per equivalent, or 225 grams per equivalent. The epoxy equivalent weight can be up to 2000 grams per equivalent, 1500 grams per equivalent, or 1000 grams per equivalent. In some embodiments, the aromatic epoxy resin may have an epoxy equivalent weight in a range of 150 to 2000 grams per equivalent, 150 to 1000 grams per equivalent, or 170 to 900 grams per equivalent. For example, the epoxy resin can have an epoxy equivalent weight in a range of 150 to 450 grams per equivalent, 150 to 350 grams per equivalent, or 150 to 300 grams per equivalent. Epoxy equivalent weights may be selected, for example, so that the epoxy resin may be used as a liquid or solid, as desired.

In some embodiments, in addition or as an alternative to aromatic epoxy resins, the epoxy resins may include one or more non-aromatic epoxy resins. In some cases, non-aromatic (i.e., aliphatic) epoxy resins can be useful as reactive diluents that may help control the flow characteristics of the compositions. Non-aromatic epoxy resins useful in the curable compositions include, for example, a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (q) of oxyalkylene groups, $-OR^5-$, wherein each $R^5$ is independently an alkylene having 2 to 5 carbon atoms. In some embodiments, $R^5$ is an alkylene with 2 to 4 carbon atoms and q is 2 to about 6 (or even higher) such as 2 to 5, 2 to 4, or 2 to 3. To become crosslinked into a network, useful non-aromatic epoxy resins will typically have at least two epoxy end groups.

Examples of useful non-aromatic epoxy resins include glycidyl epoxy resins such as those based on diglycidyl ether compounds comprising one or more oxyalkylene units. Examples of these epoxy resins include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, glycerol triglycidyl ether, propanediol diglycidyl ether, butanediol diglycidyl ether, and hexanediol diglycidyl ether. Other useful non-aromatic epoxy resins include a diglycidyl ether of cyclohexane dimethanol, a diglycidyl ether of neopentyl glycol, a triglycidyl ether of trimethylolpropane, and a diglycidyl ether of 1,4-butanediol.

Several suitable epoxy resins are commercially available. For example, several epoxy resins of various classes and epoxy equivalent weights are available from Dow Chemical Company (Midland, MI, USA), Hexion, Inc. (Columbus, OH, USA), Huntsman Advanced Materials (The Woodlands, TX, USA), CVC Specialty Chemicals Inc. (Akron, OH, USA and recently acquired by Emerald Performance Materials), and Nan Ya Plastics Corporation (Taipei City, Taiwan). Examples of commercially available glycidyl ethers include diglycidyl ethers of bisphenol A (e.g., those available under the trade designations "EPON" from Hexion Inc. (Columbus, OH, USA) (e.g., EPON 828, EPON 1001, EPON 1310, and EPON 1510), those available under the trade designation "DER." from Dow Chemical Co. (e.g., D.E.R. 331, 332, and 334), those available under the trade designation "EPICLON" from Dainippon Ink and Chemicals, Inc. (e.g., EPICLON 840 and 850), and those available under the trade designation "YL-980" from Japan Epoxy Resins Co., Ltd.)); diglycidyl ethers of bisphenol F (e.g., those available under the trade designation "EPICLON" from Dainippon Ink and Chemicals, Inc. (e.g., EPICLON 830)); polyglycidyl ethers of novolac resins (e.g., novolac epoxy resins, such as those available under the trade designation "D.E.N." from Dow Chemical Co. (e.g., D.E.N. 425, 431, and 438)); and flame retardant epoxy resins (e.g., D.E.R. 580, a brominated bisphenol type epoxy resin available from Dow Chemical Co.). Examples of commercially available non-aromatic epoxy resins include the diglycidyl ether of cyclohexane dimethanol, available from Hexion Inc. (Columbus OH, USA) under the trade designation HELOXY MODIFIER 107.

The curable composition typically contains a ratio of the moles of active amine hydrogen (from $-NH_2$ groups) in the first part to moles of epoxy groups in the second part that is in a range of 2:1 to 1:2. For example, the ratio can be in a range of 1.5:1 to 1:1.5, 1.3:1 to 1:1.3 or in a range of 1.2:1 to 1:1.2. In many embodiments, however, the ratio is selected so that there is an excess of active amine hydrogen groups. That is, the range is from 2:1 to 1.1:1, 2:1 to 1.2:1, 2:1 to 1.3:1, or 2:1 to 1.5:1.

Other Optional Components

Other optional components can be added to the first part, to the second part, or to both parts provided they do not react with other components in that part.

In some curable compositions, an optional organic solvent is included in the first part, in the second part, or in both parts. Suitable organic solvents include, but are not limited to, methanol, tetrahydrofuran, ethanol, isopropanol, pentane, hexane, heptane, acetone, methyl ethyl ketone, methyl acetate, ethyl acetate, toluene, xylene, ethylene glycol alkyl ether, propylene carbonate, and mixtures thereof. The organic solvent can be added to dissolve a component in the curable composition or can be added to lower the viscosity of the curable composition to facilitate its dispensing. The amount of the organic solvent in the curable composition can be in a range of 0 to 10 weight percent based on a total weight of the curable composition. In some embodiments, the amount is at least 0.5 weight percent, at least 1 weight percent, at least 2 weight percent, at least 3 weight percent, at least 4 weight percent and up to 10 weight percent, up to 9 weight percent, up to 8 weight percent, up to 7 weight percent, up to 6 weight percent, or up to 5 weight percent.

The curable composition optionally contains a flow control agent or thickener, to provide the desired rheological characteristics to the composition. Silica is a thixotropic agent and is added to provide shear thinning. Silica has the effect of lowering the viscosity of the curable composition when force (shear) is applied. When no force (shear) is applied, however, the viscosity seems higher. That is, the shear viscosity is lower than the resting viscosity. The silica typically has a longest average dimension that is less than 500 nanometers, less than 400 nanometers, less than 300 nanometers, less than 200 nanometers, or less than 100 nanometers. The silica particles often have a longest average dimension that is at least 5 nanometers, at least 10 nanometers, at least 20 nanometers, or at least 50 nanometers. In some embodiments, the silica particles are fumed silica such as treated fumed silica, available under the trade designation CAB-O-SIL TS 720, and untreated fumed silica available under the trade designation CAB-O-SIL M5, from Cabot Corporation (Alpharetta, GA, USA). In other embodiments, the silica particles are non-aggregated nanoparticles.

If used, the amount of the optional silica particles is at least 0.5 weight percent based on a total weight of the curable composition. The amount of the silica can be at least 1 weight percent, at least 1.5 weight percent, or at least 2 weight percent and can be up to 10 weight percent, up to 8 weight percent, or up to 5 weight percent. For example, the amount of silica can be in a range of 0 to 10 weight percent, 0.5 to 10 weight percent, 1 to 10 weight percent, 0.5 to 8 weight percent, 1 to 8 weight percent, 0.5 to 5 weight percent, or 1 to 5 weight percent.

The curable composition can optionally include fibers for reinforcement of the cured composition. However, in many embodiments, the curable compositions are free or substantially free of fiber reinforcement. As used herein, "substantially free" means that the curable compositions contain no greater than 1 weight percent, no greater than 0.5 weight percent, no greater than 0.2 weight percent, no greater than 0.1 weight percent, no greater than 0.05 weight percent, or no greater than 0.01 weight percent of fibers.

In some embodiments, the curable composition optionally contains adhesion promoters to enhance the bond to the substrate. The specific type of adhesion promoter may vary depending upon the composition of the surface to which it will be adhered. Various silane and titanate compounds have been used to promote adhesion to the first substrate and/or the second substrate that are bonded together with the cured composition. If present, the amount of the adhesive promoter would be up to 5 weight percent, up to 3 weight percent, up to 2 weight percent, or up to 1 weight percent and at least 0.1 weight percent, at least 0.2 weight percent, or at least 0.5 weight percent based on the total weight of the curable composition.

Still other optional components include, for example, fillers (e.g., aluminum powder, carbon black, glass bubbles, talc, clay (e.g., montmorillonite, bentonite, or halloysite), calcium carbonate, calcium triflate, barium sulfate, titanium dioxide, and mica), stabilizers, plasticizers, tackifiers, cure rate retarders, impact modifiers, toughening agents (e.g., core-shell rubbers), expandable microspheres, glass beads or bubbles, thermally conductive particles, electrically conductive particles, corrosion inhibitors, fire retardants, antistatic materials, glass, pigments, colorants, waxes (e.g., hydrogenated oils or amides), UV stabilizers, and antioxidants. The optional components can be added, for example, to reduce the weight of the structural adhesive layer, to adjust the viscosity, to provide additional reinforcement, to modify the thermal or conductive properties, to alter the rate of curing, and the like. If any of these optional components are present, they are typically used in an amount that does not prevent the printing or dispensing of the curable composition.

Any of these additional optional components can be in the first part, the second part, or either providing they do not result in substantial curing of other components in these parts.

Cured Composition

The curable composition, which includes both the first part and the second part, is mixed, and reacted to form the cured composition. That is, the cured composition is a reaction product of the first and second parts. The first and second parts are typically fluids at the mixing temperature, which is often no greater than 40 degrees Celsius such as at or near room temperature (e.g., 20 to 25 degrees Celsius). Optional additional parts can be mixed with the first part and the second part. Any suitable method can be used to combine the various parts of the curable compositions.

The first and second parts can be mixed manually or with any known mechanical mixing and/or dispensing device. For example, the first part can be in a first chamber and the second part can be in a second chamber of a multi-chambered mixing and/or dispensing device. In certain embodiments, the multi-chambered mixing and/or dispensing device is a dual barreled syringe. Optionally, the dual barreled syringe may include or be connected to a static mixing device to mix the contents of each barrel upon delivery from the syringe and prior to discharging the cured composition (i.e., mixed composition) on the location of interest. While some curing may occur within the mixing device, the reaction mixture is typically still fluid when discharged from the mixing device. Although not required, the viscosity of the first part and the second part are often selected to be similar so that the part can be effectively mixed.

The mixed composition can be discharged on any suitable surface and the resulting cured composition is often used to adhere a first substrate to a second substrate. The cured composition is usually a structural adhesive. The various substrates that are joined can be the same or different and often are selected from polymeric material, glass or ceramic material, metal or metal oxide materials, and the like.

The cured composition desirable has a percent elongation at break that is at least 10 percent using ASTM Method D638-2014 as described in the Examples below. The percent elongation is often at least 40 percent, at least 50 percent, at least 60 percent, at least 70 percent, or at least 80 percent.

The cured composition usually has an overlap shear strength of at least 600 and often at least 800 or at least 1000 pounds per square inch (psi). The overlap shear strength is often at least 1500 psi, at least 2000 psi, at least 2500 psi, at least 3000 psi, at least 3500 psi, or at least 4000 psi where 145 psi is equal to 1 MPa.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

Materials List

| DESIGNATION | DESCRIPTION | SOURCE |
|---|---|---|
| Diethyl Oxalate | CAS# 95-92-1 | Alfa Aesar, Tewksbury, MA |
| JD400 | Difunctional amine-terminated polyether obtained under the trade designation "JEFFAMINE D-400 Polyetheramine" | Huntsman Corporation, The Woodlands, TX |
| JD230 | Difunctional amine-terminated polyether obtained under the trade designation "JEFFAMINE D-230 Polyetheramine" | Huntsman Corporation, The Woodlands, TX |
| JD2000 | Difunctional amine-terminated polyether obtained under the trade designation "JEFFAMINE D-2000 Polyetheramine" | Huntsman Corporation, The Woodlands, TX |
| TTD | 4,7,10-Trioxa-1,13-tridecancediamine | TCI America, Portland, OR |
| EPON 828 | BPA Epoxy solution obtained under the trade designation "EPON 828" | Hexion Inc., Columbus, OH |
| JTHF100 | Difunctional amine-terminated polyether obtained under the trade designation "JEFFAMINE THF 100 Polyetheramine" | Huntsman Corporation, The Woodlands, TX |
| P1075 | High-purity dimer acid diamine, obtained under the trade name "PRIAMINE 1075" | Croda Inc., Chino Hills, CA |
| IMERSEAL 75 | Surface treated calcium carbonate with an average particle size of 1.6 microns; obtained under the trade name "IMERSEAL 75" | Imerys Carbonates, Roswell, GA |
| CTS-720 | Hydrophobically modified fumed silica; obtained under the trade name "CAB-O-SIL TS-720" | Cabot Corporation, Alpharetta, GA |
| K54 | 2,4,6-tris-(dimethylaminomethyl)phenol | TCI America, Portland, OR |
| Calcium Triflate | Calcium trifluoromethanesulfonate | 3M Company, St. Paul, MN |

Test Methods

Overlap Shear Test Method

The performance of adhesives derived from oxamide amines was determined using overlap shear tests. Aluminum coupons (1 inch×4 inch×0.062 inch; 2.5 centimeters (cm)×10.2 cm×0.16 cm) were wiped with methyl ethyl ketone and grit blasted. The mixture was then applied to a 1 inch×0.5 inch (2.5 cm×1.3 cm) area on one end of the aluminum coupon, and 3-5 mil (0.008-0.013 cm) spacer beads were placed on the resin to act as bondline spacers. One end of a second aluminum coupon was then pressed into to the mixture to produce an overlap of approximately 0.5 inch (1.3 cm). A binder clip was used to secure the sample, and it was allowed to cure for at least 18 hours. The samples were heated to 150° F. (65° C.) for 2 hours and cooled to room temperature before testing. The samples were tested to failure in shear mode at a rate of 0.1 inch/minute (0.25 cm/minute) using a tensile load frame with self-tightening grips (MTS Systems, Eden Prairie, MN). The overlap shear value was then calculated by dividing the peak load by the overlap area.

Elongation Test Method

The resulting mixtures were coated between silicone-treated polyester release liners at approximately 1 millimeter (mm) thickness. The coated films were allowed to cure for at least 18 hours. The samples were heated to 150° F. (65° C.) for 2 hours and cooled to room temperature before testing. Tensile elongation measurements were performed according to ASTM Standard D638-14 "Standard Test Method for Tensile Properties of Plastics" (2015), using a TYPE-V die for specimen cutting, and a 2 inch/minute (5.1 cm/minute) crosshead test speed.

Nuclear Magnetic Resonance (NMR)

A portion of the oxamide-amine materials and other polyamines were analyzed as a solution of unknown concentration (generally approximately 12 milligrams/milliliter (mg/mL)) in dimethyl sulfoxide-D6. NMR spectra were acquired on a Bruker AVANCE 600 megahertz (MHz) NMR spectrometer equipped with an inverse cryoprobe.

$^1$H-NMR analysis was used to confirm molecular structure, determine the molecular weight, and amine (—NH) equivalents for each of the oxamide-amine and polyamine materials used.

General Oxamide-Amine Preparation and First Part Composition

Diethyl oxalate was added to a glass jar or vial at 23° C. followed by amine addition. The amounts of amine that were added correspond to the equivalent values in Table 2 (relative to the equivalents of diethyl oxalate). To ensure sequence control over the oligomer backbone architecture, a multi-step synthetic method can be employed in which the order of addition of Amines proceeds from Amine 1 to Amine 3, with at least 30 minutes of heating at 80° C. between additions. The mixture was stirred magnetically at 700 revolutions per minute (RPM), followed by heating to 80° C. for approximately one hour. Ethanol was removed from the reaction via evaporation while heating.

TABLE 2

Oxamide Formulations

| SAMPLE | DIETHYL OXALATE, g | AMINE 1 TYPE | AMINE 1 g | AMINE 2 TYPE | AMINE 2 g | AMINE 3 TYPE | AMINE 3 g |
|---|---|---|---|---|---|---|---|
| A8 | 36.4 | JD400 | 82.7 | JTHF100 | 13.3 | TTD | 30.6 |
| A11 | 3.57 | JD230 | 6.29 | JD2000 | 6.22 | TTD | 6.20 |
| A12 | 3.13 | JD400 | 10.2 | JD2000 | 4.29 | TTD | 5.27 |
| A13 | 2.94 | JD400 | 12.1 | JD2000 | 1.21 | TTD | 5.86 |
| A14 | 34.1 | JD230 | 48.9 | TTD | 17.04 | | 0 |
| A15 | 31.8 | JD230 | 68.2 | | 0 | | 0 |
| A18 | 109.63 | JD400 | 215.00 | TTD | 80.25 | | 0 |
| A19 | 22.02 | JTHF100 | 101.05 | TTD | 44.07 | | 0 |
| A20 | 80.66 | JD230 | 88.10 | TTD | 81.25 | | 0 |
| A21 | 79.62 | JD230 | 170.38 | | 0 | | 0 |
| A22 | 60.97 | JD400 | 127.62 | TTD | 61.41 | | 0 |
| A23 | 48.12 | JD400 | 201.88 | | 0 | | 0 |
| A24 | 175.40 | P1075 | 160.50 | JD400 | 258.50 | TTD | 132.20 |

TABLE 3

Oxamido-containing Amine Curative Formulations (First Part Composition)

| FIRST PART | JD230, g | JD400, g | TTD, g | OXAMIDE CURATIVE Type (from Table 2) | OXAMIDE CURATIVE g | CTS-720, g | CALCIUM TRIFLATE, g | K54, g |
|---|---|---|---|---|---|---|---|---|
| B3 | 1.25 | 1.85 | 0 | A11 | 15.84 | 0.13 | 0.40 | 0.40 |
| B4 | 1.56 | 4.36 | 0 | A12 | 17.89 | 0.16 | 0.47 | 0.47 |
| B5 | 1.79 | 3.09 | 0 | A13 | 19.50 | 0.16 | 0.49 | 0.49 |
| B6 | 0 | 10.04 | 18.6 | A18 | 70.08 | 0 | 0.70 | 0.70 |
| B7 | 1.80 | 8.98 | 0 | A20 | 17.96 | 0.18 | 0.54 | 0.54 |
| B8 | 3.95 | 5.93 | 0 | A22 | 23.73 | 0.20 | 0.59 | 0.59 |
| B9 | 5.61 | 5.61 | 0 | A22 | 22.46 | 0.19 | 0.56 | 0.56 |
| B10 | 0 | 0 | 4.08 | A22 | 24.49 | 0.20 | 0.61 | 0.61 |
| B11 | 6.59 | 6.59 | 0 | A23 | 39.5 | 0.33 | 0.99 | 0.99 |
| B12 | 1.80 | 8.98 | 0 | A8 | 18.0 | 0.18 | 0.54 | 0.54 |
| B13 | 4.72 | 0 | 0 | A21 | 33.33 | 0.28 | 0.83 | 0.83 |
| B14 | 4.97 | 11.47 | 0 | A22 | 45.88 | 0.38 | 1.15 | 1.15 |
| B15 | 3.89 | 11.68 | 0 | A21 | 46.71 | 0.39 | 1.17 | 1.17 |
| B16 | 0 | 16.33 | 0 | A20 | 40.82 | 0.41 | 1.22 | 1.22 |
| B17 | 0 | 0 | 12.50 | A24 | 37.50 | 0 | 0.35 | 0.35 |
| B18 | 0 | 30.00 | 0 | A24 | 20.00 | 0 | 0.35 | 0.35 |
| B19 | 0 | 0 | 14.00 | A19 | 40.00 | 0 | 0.35 | 0.35 |
| B20 | 0 | 0 | 0 | A18 | 50.78 | 0 | 0.86 | 0.86 |

Epoxy Curative (Second Part Composition)

To a plastic cup, EPON 828 (59.5 g), IMERSEAL 75 (14.9 g), and CAB-O-SIL TS-720 (0.60 g) were added. The mixture was mixed at 2500 RPM for 30 seconds.

Test Sample Preparation

For all EXAMPLES and COMPARATIVE EXAMPLES except EXAMPLE 18 the is oxamido-containing amine curative (first part composition—Table 3) and the epoxy mixture were mixed in a 1:1 volumetric ratio by dispensing through a static mixing nozzles. Example 18 was prepared by placing 20.0 g of the EPOXY CURATIVE and 31.5 g of composition B20 into a plastic cup and mixed with a FlackTek SPEEDMIXER (FlackTek Inc. Landrum, SC, USA) at 2000 RPM for 30 seconds

TABLE 4

1:1 volumetric ratio of first part to second part

| EXAMPLES (E) and COMPARATIVE EXAMPLES (CE) | FIRST PART (from Table 3) | SECOND PART (described above) | OLS, psi (MPa) | ELONGATION, % |
|---|---|---|---|---|
| E1 | B16 | EPOXY CURATIVE | 2502 (17.3) | 596 |
| CE2 | B15 | EPOXY CURATIVE | 3652 (25.2) | 7.7 |
| E3 | B14 | EPOXY CURATIVE | 1697 (11.7) | 97.1 |

TABLE 4-continued

| 1:1 volumetric ratio of first part to second part | | | | |
|---|---|---|---|---|
| EXAMPLES (E) and COMPARATIVE EXAMPLES (CE) | FIRST PART (from Table 3) | SECOND PART (described above) | OLS, psi (MPa) | ELONGATION, % |
| CE4 | B13 | EPOXY CURATIVE | 4103 (28.3) | 7.6 |
| E5 | B7 | EPOXY CURATIVE | 3094 (21.3) | 40.0 |
| E6 | B8 | EPOXY CURATIVE | 1999 (13.8) | 56.3 |
| E7 | B9 | EPOXY CURATIVE | 2353 (16.2) | 65.0 |
| E8 | B10 | EPOXY CURATIVE | 2630 (18.1) | 47.3 |
| E9 | B12 | EPOXY CURATIVE | 1926 (13.3) | 56.3 |
| CE10 | B11 | EPOXY CURATIVE | 1512 (10.4) | 33.3 |
| E11 | B3 | EPOXY CURATIVE | 1838 (13) | 65.4 |
| E12 | B4 | EPOXY CURATIVE | 1309 (9) | 63.5 |
| E13 | B5 | EPOXY CURATIVE | 1480 (10) | 85.9 |
| E14 | B6 | EPOXY CURATIVE | 1681 (11.6) | 95.6 |
| E15 | B17 | EPOXY CURATIVE | 1322 (9.1) | 54.6 |
| E16 | B18 | EPOXY CURATIVE | 1372 (9.5) | 77.4 |
| E17 | B19 | EPOXY CURATIVE | 2192 (15.1) | 137.6 |
| E18 | B20 | EPOXY CURATIVE | 764.1 (5.27) | 600.9 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-part curable composition comprising:

a) a first part comprising an oxamido-containing compound with at least two —$NH_2$ groups, the oxamido-containing compound comprising at least one group of Formula (I) and at least one group of Formula (II)

$$*—(CO)—(CO)—NH—R^1—NH—* \quad (I)$$

$$*—(CO)—(CO)—NH—R^2—NH—* \quad (II)$$

wherein $R^1$ is the residue of a first polyamine of formula $H_2N—R^1—NH_2$ minus two —$NH_2$ groups, wherein in Formula (I) $R^1$ is a (hetero) hydrocarbylene having a first carbon atom bonded to a first-NH group and a second carbon atom boned to a second —NH— group where the first carbon atom and the second carbon atom are each independently a tertiary carbon atom or a quaternary carbon atom;

$R^2$ is the residue of a second polyamine $H_2N—R^2—NH_2$ minus two —$NH^2$ groups, wherein the second polyamine is different than the first polyamine and wherein $R^2$ in Formula (II) is a (hetero) hydrocarbylene having a first carbon atom bonded to a first —NH— group and a second carbon atom boned to a second —NH— group where the first carbon atom and the second carbon atom are each a secondary carbon atom;

an asterisk (*) indicates an attachment site to another group in the oxamido-containing compound; and b) a second part comprising an epoxy resin.

2. The two-part curable composition of claim 1, wherein the first polyamine has a weight average molecular weight in a range from greater than 225 to 5000 grams/mole and the second polyamine has a weight average molecular weight in a range from 60 to 225 grams/mole.

3. The two-part curable composition of claim 1, wherein the oxamido-containing compound has terminal groups of formula —NH—$R^2$—$NH_2$.

4. The two-part curable composition of claim 3, wherein the oxamido-containing compound has an average of 2 to 7 oxamido groups.

5. The two-part curable composition of claim 1, wherein the first part has an active amine hydrogen (—$NH_2$) equivalent weight in a range of 300 to 10,000 g/equivalent.

6. The two-part curable composition of claim 1, wherein the oxamido-containing compound comprises a plurality of different $R^1$ groups and/or a plurality of different $R^2$ groups.

7. The two-part curable composition of claim 1, wherein the oxamido-containing compound further comprises at least one group of Formula (VII)

$$*—(CO)—(CO)—NH—R^3—NH—* \quad (VII)$$

wherein $R^3$ is the residue of a third polyamine of formula $H_2N—R^3—NH_2$ minus two —$NH_2$ groups, wherein $R^3$ in Formula (VII) is a (hetero) hydrocarbylene having a first carbon atom that is a secondary carbon atom bonded to a first —NH— group and a second carbon atom that is a secondary or tertiary carbon atom bonded to a second —NH— group; and the third polyamine has a weight average molecular weight in a range greater than 225 to 750 grams/mole when the second carbon atom is the secondary carbon atom and has a weight average molecular weight in a range greater than 100 to 750 grams/mole when the second carbon atom is a tertiary carbon atom.

8. The two-part curable composition of claim 1, wherein the first part further comprises a fourth polyamine having at least two —NH2 groups, the fourth polyamide being free of a —(CO)—(CO)— group.

9. The two-part curable composition of claim 8, wherein the first part comprises 35 to 100 weight percent of the oxamido-containing compound and 0 to 65 weight percent of the fourth polyamine based on a total weight of curable components in the first part.

10. The two-part curable composition of claim 1, wherein a ratio of the moles of active amine hydrogen in the first part to the moles of epoxy groups in the second part is in a range of 2:1 to 1:2.

11. The two-part curable composition of claim 1, wherein the first and the second part are both flowable at a temperature no greater than 40 degrees Celsius.

12. A cured composition comprising a reaction product of the two-part curable composition of claim 1.

13. The cured composition of claim 12, wherein the cured composition is a structural adhesive.

14. The cured composition of claim 13, wherein the structural adhesive has an overlap shear strength greater than 1000 psi (6.895 MPa).

15. The cured composition of claim 13, wherein the tensile elongation is at least 40 percent.

* * * * *